United States Patent [19]
Knapp

[11] 3,869,269
[45] Mar. 4, 1975

[54] METHOD AND APPARATUS FOR PRESS SHAPING HEAT-SOFTENED SHEETS

[75] Inventor: Isaac D. Knapp, Galion, Ohio

[73] Assignee: PPG Industries, Inc., Pittsburgh, Pa.

[22] Filed: June 20, 1973

[21] Appl. No.: 371,910

[52] U.S. Cl.................. 65/106, 65/245, 65/253, 65/273, 65/285, 264/175, 264/285
[51] Int. Cl............................................. C03c 23/02
[58] Field of Search ............ 65/104, 106, 107, 273, 65/245, 253, 275, 286; 264/175, 285

[56] References Cited
UNITED STATES PATENTS
3,701,644  10/1972  Frank................................ 65/273 X Primary Examiner—Arthur D. Kellogg
Attorney, Agent, or Firm—Edward I. Mates; Thomas F. Shanahan

[57] ABSTRACT

Method and apparatus for controlling deviations from desired shape of a glass sheet during roll forming wherein, in between adjacent pairs of shaping rolls, additional rolling contact is provided against that portion of the sheet that deviates from the shape desired.

21 Claims, 3 Drawing Figures

METHOD AND APPARATUS FOR PRESS SHAPING HEAT-SOFTENED SHEETS

BACKGROUND OF THE INVENTION

The present invention relates to shaping glass sheets, and particularly concerns a method and apparatus for shaping a series of glass sheets by the roll forming method. According to the roll forming method, a series of heat-softened glass sheets is conveyed between an upper set and a lower set of shaping rolls of complementary shape. When each glass sheet reaches a position between the sets of shaping rolls, the latter move relative to one another into a sheet engaging position for sufficient time for the shape of the rolls to be impressed on the glass sheet as the latter passes between the sets of shaping rolls. The sets are separated and the shaped glass sheet proceeds to a cooling or quenching station where the glass sheet is cooled to impart either a partial or full temper or an anneal depending on the rate of cooling. When the next heat-softened glass sheet in the series arrives between said sets, the sets are again moved relative to one another to their sheet engaging position. Such continuous sheet movement has resulted in increasing the rate of production of shaped glass sheets.

The need for curved glass sheets has increased tremendously in recent years, particularly with the increase in use of curved glass for windshields, sidelights and rear windows of automobiles. The problem of increasing the rate of production of shaped glass sheets on a mass production line has been recognized and new methods and apparatus that do not necessarily require glass sheets to be stopped at a shaping station have been developed, as is evidenced by U.S. Pat. No. 3,545,951 to Maurice Nedelec and U.S. Pat. No. 3,701,644 to Robert G. Frank. These patents illustrate different embodiments of apparatus for shaping continuously moving glass sheets by the so called roll forming method.

The Nedelec patented apparatus has capabilities of shaping glass sheets to a limited family of shapes about one axis only to shapes that are of uniform curvature from end to end of the sheets along the path of glass sheet movement through the roll forming apparatus. The Frank patented apparatus is also capable of producing bends about a single axis of bending and in addition can produce compound bends comprising bends about two mutually perpendicular axes or bends whose radii of curvature vary from portion to portion of the bent sheets along the path of sheet movement through the roll forming apparatus. When the Frank patented apparatus has been used to produce simple cylindrical bends about a single axis, from time to time, local deviations in curvature have been discovered. Such deviations from desired curvature are also believed to be inherent in the operation of the Nedelec patented apparatus.

One of the problems associated with roll forming is the development of kinks along one or both longitudinal edges of glass sheets shaped by roll forming apparatus. This is particularly noticeable in the shaping of glass sheets of relatively small dimensions and is termed "edge kinking". Another defect attributed to roll forming that is found in relatively long sheets is excessive sag, particularly in the central portion of the sheet. At times, edge kinking and/or excessive sag was so great that shaped glass sheets fabricated on roll forming apparatus were not acceptable by the customer because of their failure to meet the tolerances established by the customer.

The present invention makes it possible to reduce the defects associated with prior art roll forming apparatus to such an extent that the resulting articles are acceptable to the customer for curvature without tending to introduce optical defects in acceptably shaped glass sheets fabricated by roll forming operations.

SUMMARY OF THE INVENTION

The present invention makes it possible to reduce the deviations from desired shape by a method which comprises applying additional rolling contact against a portion of one of the surfaces of a newly shaped glass sheet when said portion deviates from the shape desired therefor by at least a predetermined amount before the sheet cools to below its deformation temperature. The additional rolling contact is provided against the upper surface of the glass sheet along its edge in the case edge kinking is present. In case the glass shape produced by roll forming includes too great a sag, the additional rolling contact is applied against the bottom surface only of the glass in its sagged portion to help the glass assume a shape conforming more closely to that desired.

The present invention is designed specifically to produce shaped glass sheets with a minimum of optical defects and free of deviations in shape so great as to be unacceptable in commerce. The apparatus aspect of the present invention involves the incorporation of additional roller means disposed in spaced relation to the conventional shaping rolls of roll forming apparatus. Means are provided for supporting said additional roller means in position to engage a portion of the surface of the glass sheet that deviates in the direction of said engaged surface from the shape desired therefor by at least a predetermined amount.

Glass sheets arrive at a shaping apparatus in a deformable state. They are usually heated to their deformation temperature within a furnace and when they reach a position of alignment between an upper set of rotatable shaping rolls and a lower set of rotatable shaping rolls (each shaping roll of the upper set having a shape complementary to that of a corresponding shaping roll of the lower set), means for providing relative movement between the upper set and the lower set causes relative movement between the sets from a retracted position wherein corresponding rolls of said sets are separated from one another by sufficient distance to permit clearance for the glass sheet to pass between said sets undisturbed by shaping forces and a glass sheet engaging position wherein the shaping rolls of the upper set engage the upper surface of the glass sheet while the shaping rolls of the lower set simultaneously engage the lower surface of the glass sheet, thus providing a bending force onto the heat-softened glass sheet. The glass continues to move between the rolls while the rolls apply pressure against the opposite glass surfaces. Before the glass sheet emerges from between the rolls, the additional roller means makes contact where needed against the distorted portion of the surface in the direction of distortion in spaced relation to other sheet engaging means, preferably contacting one surface only unopposed by aligned rolling contact applied against the opposite surface so as to provide the correction in the glass shape before the glass has been cooled to below its deformation temperature. The newly shaped glass is then cooled at a desired rate. The rate of cooling is rapid when it is desired to temper the glass and the rate of cooling is less rapid if the glass is desired to be annealed.

The present invention will be understood better in the light of a description of an illustrative embodiment and variations thereof that follows.

BRIEF DESCRIPTION OF THE DRAWINGS

In the drawings which form part of the description of the illustrative embodiment that follows.

DESCRIPTION OF THE PREFERRED EMBODIMENT

Figure 1:
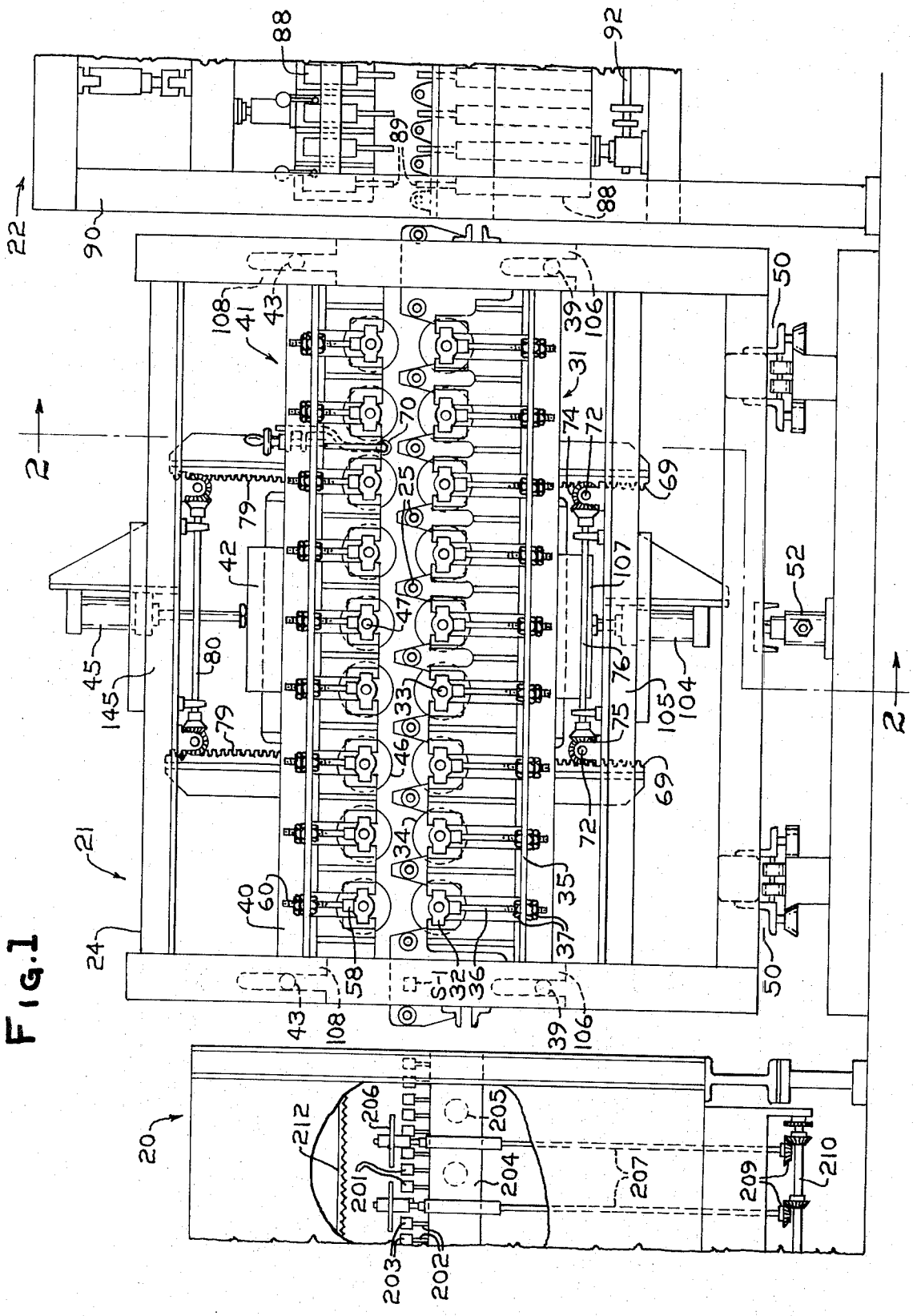
FIG. 1 is a longitudinal elevation of a portion of a preferred embodiment of apparatus of the roll forming type conforming to the present invention.

Referring to the drawings, FIG. 1 discloses a side view of an important part of roll forming apparatus conforming to the present invention. Generally, the apparatus is similar to that disclosed in FIG. 21 of U.S. Pat. No. 3,701,644 to Robert G. Frank incorporating one of the modifications of the present invention. The roll forming apparatus comprises a heating furnace 20 of the gas hearth type, a roll forming station 21 and a cooling or quenching station 22 also depicted in detail in the aforesaid Frank patent. A conveyor system conveys a series of glass sheets through the tunnel 20, the roll forming station 21 and the cooling or quenching station 22.

A glass sensing device S-1 of the type well known in the art, such as a fluidic sensing device, is located near the entrance of the roll forming station 21 to detect the passage of the trailing edge of a glass sheet to actuate operation of the roll forming apparatus to perform its sheet forming function.

while the illustrative embodiment of the present invention shows a heated furnace of the gas hearth type, which is based on apparatus depicted in U.S. Pat. No. 3,233,501 to James C. Fredley et al., assigned to PPG Industries, Inc., the gas hearth furnace may also be that disclosed in U.S. Pat. Nos. 3,332,759 and 3,332,760 to Harold E. McMaster et al. Furthermore, the conveyor for the furnace may be of the type containing glass engaging members that move the glass sheets through the hot furnace by edge contact only, or of the roller hearth type such as depicted in U.S. Pat. No. 3,245,772 to James H. Cypher et al., assigned to PPG Industries, Inc., where glass sheets are conveyed in succession over a series of longitudinally spaced conveyor rolls, which are rotated in unison to propel the glass sheets through a heated tunnel-like furnace.

In a gaseous hearth system of the preferred embodiment of the present invention, the furnace 20 is provided with a flat bed formed from a series of modules 201 arranged geometrically like a mosaic in close juxtaposition to each other. Each module has an upper terminus of rectangular configuration. The upper termini lay in a common plane that is obliquely arranged at a small angle (preferably approximately 5°) to the horizontal transversely of the lengthwise dimension of the bed. The latter extends throughout the length of the furnace.

In a gas hearth, the modules 201 are arranged in successive rows crossing the path of travel intended for glass sheets undergoing treatment. Each row of modules is at an oblique angle of about 10° to the path taken by the glass sheets through the length of the furnace 20. Each module has a relatively narrow stem 202 opening up into a module plenum chamber 203 positioned below the gas hearth bed and acting as a support for the bed. Each module extends upward from a common plenum chamber 204 and is substantially enclosed and is spaced from adjacent modules by an exhaust zone. The exhaust zones communicate with exhaust passages 205 extending transversely of the common plenum chamber 204 below the surface of the gas hearth bed and above common plenum chamber 204. The bed is adjusted to such a level that the plane of the upper termini of the modules lies parallel to but just below an oblique plane defined by the upper surface of rotatable conveyor rolls 25 of the roll forming station 21. As an alternative, the gas hearth bed may be composed of a relatively thick apertured wall having hot gas delivery passageways of circular cross-section arranged in a mosaic pattern in an upward direction from a plenum chamber to the upper surface of the wall. Each delivery passageway is surrounded by a series of escape ports of larger circular cross-section as depicted in U.S. Pat. No. 3,455,669 to Harold E. McMaster et al., in this alternative gaseous hearth construction.

In the gas hearth furnace, glass sheets are supported by a thin gaseous bed in an oblique plane and are engaged along their lower side edges only by means of a series of rotating driving discs 206 disposed in a series along the lower side edge of the gas hearth bed. The discs rotate in unison to propel a series of glass sheets along the length of the gas hearth bed toward the roll forming station 21. The discs 206 are driven in unison by drive shafts 207. The latter in turn are driven through spur gears 209 by a main drive shaft 210. Electrical resistance heaters 212 are provided in the roof of the heating furnace 20 to irradiate heat against the upper surface of each sheet while its lower surface is both heated and supported by the hot gases applied through the modules against said lower surface.

The conveyor rolls 25 of the roll forming station 21 are disposed to form an upper common tangential plane which is an extension of the oblique plane of support provided by the gas hearth bed formed by the gas applied through the array of modules in the furnace 20.

Figure 2:
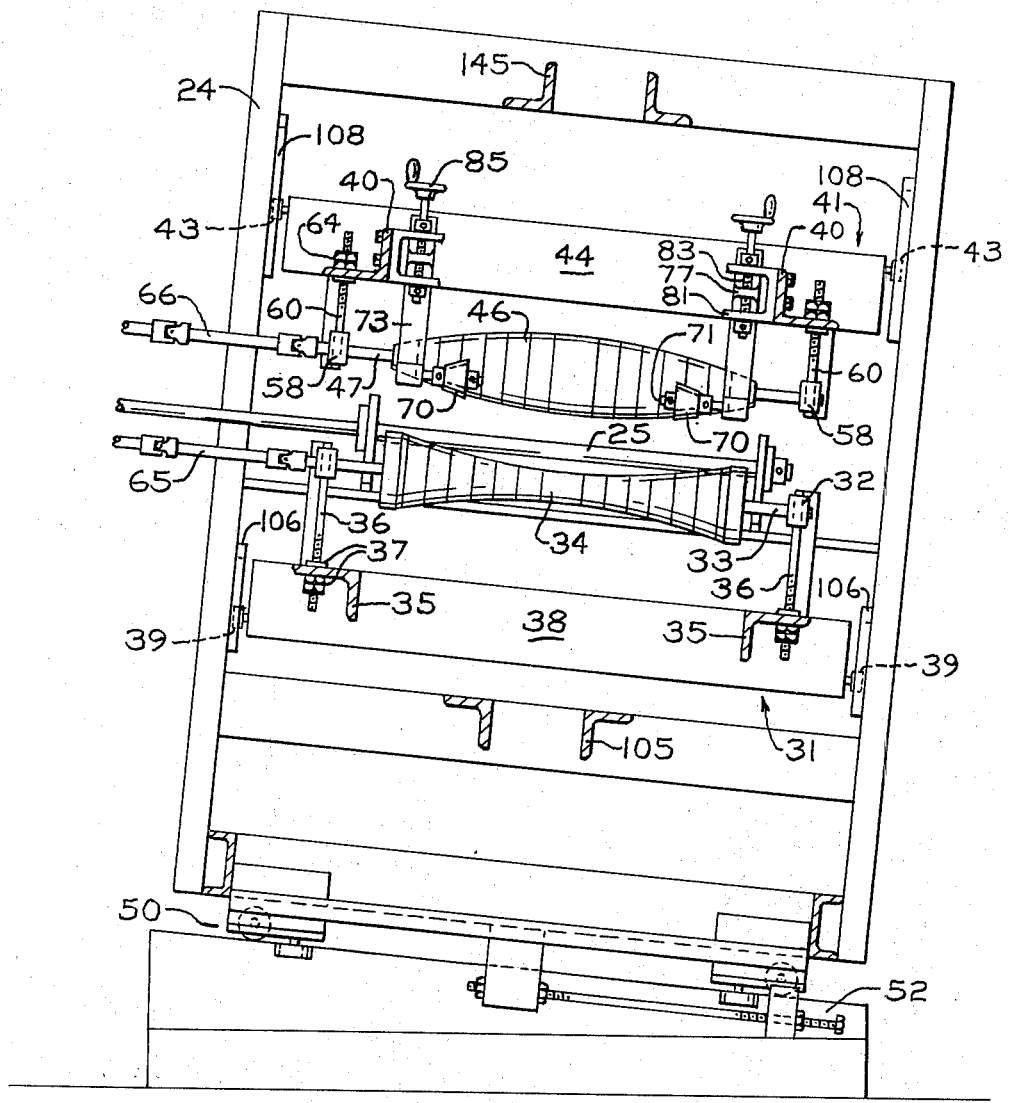
FIG. 2 is a cross-sectional view taken along the lines 2—2 of FIG. 1, showing how the illustrative embodiment may be adjusted to eliminate edge kinking of glass sheets shaped by roll forming.
Figure 3:
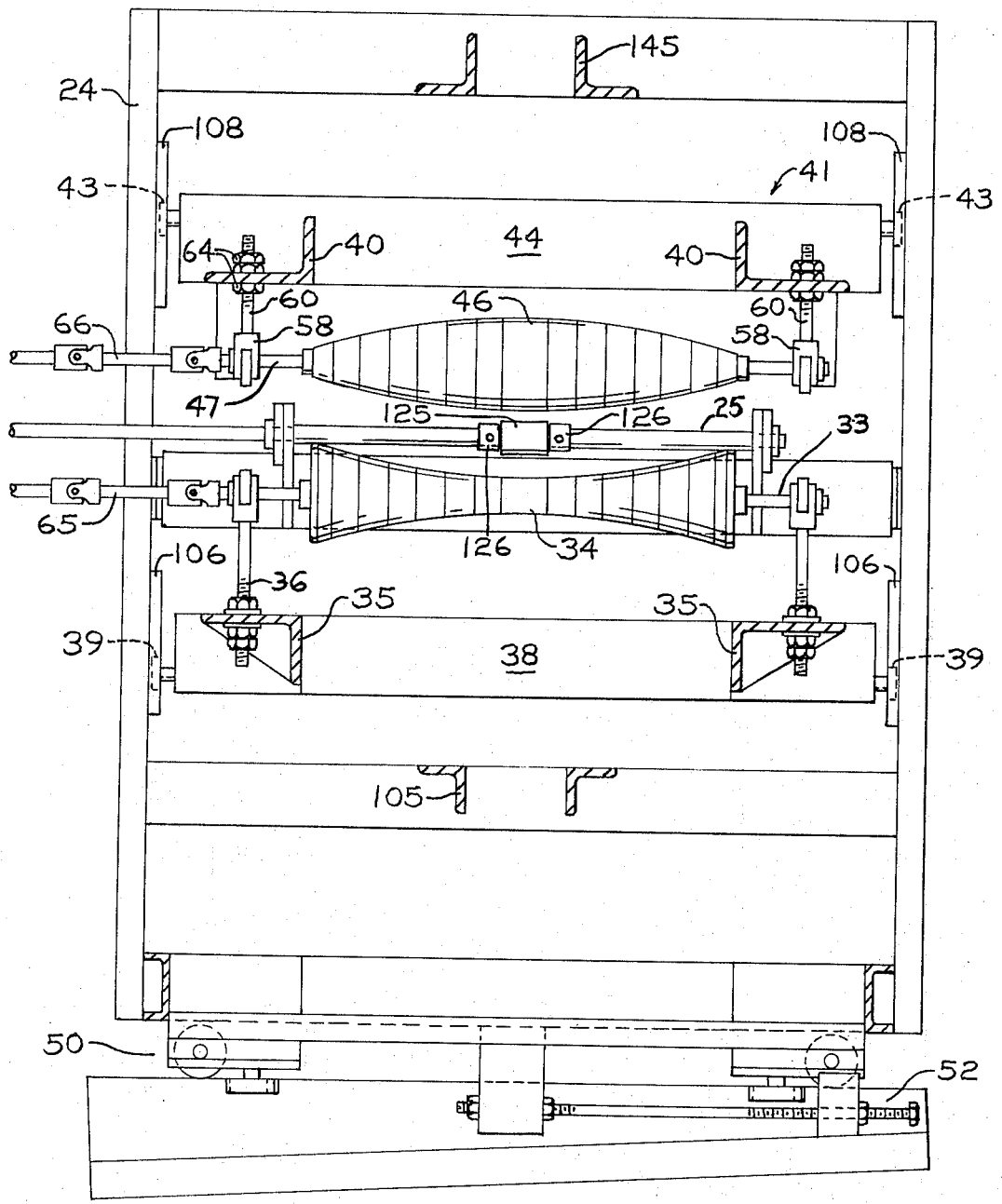
FIG. 3 is a sectional view similar to FIG. 2 showing how the illustrative embodiment may be modified to control excessive sag in roll forming glass sheets fabricated on the apparatus of FIG. 1.

The roll forming station 21 of the present invention comprises an open reinforced frame structure 24 to which are movably supported a lower roll housing 31 and an upper roll housing 41. Both roll housings are oriented in an oblique plane extending at an angle of approximately 5° to the horizontal to be parallel to the oblique surface of the gas hearth bed in the furnace 20. The lower roll housing 31 comprises a pair of sets of vertical brackets 32, each arranged in a horizontal row to receive one or the other opposite axial ends of one of a series of straight lower common shafts 33. The brackets 32 on the right side of FIGS. 2 and 3 are disposed in spaced positions along a horizontal plane lower than the horizontal plane along which the horizontal line of brackets to the left of FIGS. 2 and 3 are disposed. Thus, the series of common shafts 33 are capable of alignment with one another in a plane parallel to the plane of support provided by the gas hearth bed in the tunnel-like furnace.

Each of the lower common shafts 33 rotatably supports one of a series of lower segmented pressing rolls 34. Each segment of the segmented rolls 34 is 2 inches in axial length except for the centermost segments which are 4 inches long. Each central shaping segment is flanked by seven flanking shaping segments in the illustrated embodiment.

A pair of apertured longitudinal angle members 35 are supported by the lower roll housing 31 with their apertures aligned below apertures in each of the brackets 32 to receive the lower ends of threaded shafts 36. Suitable lock nuts 37 are provided to adjust the axial position of each threaded shaft 36 relative to its angle member 35 so as to fix the position of each bracket 32 relative to the lower roll housing 31. Each angle member 35 interconnects a pair of lower end plates 38. A roller 39 is attached to each end of each lower end plate 38.

The vertical position of each bracket, as determined by adjustment of its associated threaded shaft 36, controls the position of an end of a lower common shaft 33. This establishes the orientation of the segmented rolls 34 that are mounted on the shafts 33. Each shaft 33 is straight to facilitate mounting and replacement of a segmented roll of desired configuration thereon. It is thus a simple matter to remove one set of shaping rolls conforming to one configuration and replace it with another set of shaping rolls conforming to another configuration whenever it is required to produce a different part.

The lower roll housing 31 is rigidly attached to a lower vertical piston 104 mounted on a piston support structure 105 attached to the open reinforced frame structure 24. A pair of lower vertically slotted plates 106 are carried by structure 24 for receiving the rollers 39 attached to each plate 38 of the lower roll housing 31. A cross beam 107 is attached to the upper end of piston 105 and interconnects lower apertured angle members 35 to enable the latter to respond to movement of piston 104.

The open reinforced frame structure 24 also carries two pairs of upper plates 108 that are vertically slotted to receive upper guide rollers 43 fixed to the ends of upper plates 44 which interconnect the opposite ends of a pair of upper apertured longitudinal angle members 40 that form part of an upper roll housing 41. The upper angle members 40 are attached to a cross beam 42 which is fixed to a free end of a downwardly extendable piston 45. A cylinder for the piston is supported on a piston support struction 145 forming part of the reinforced frame structure 24.

In vertical planes intermediate the vertical planes occupied by the conveyor rolls 25 and in alignment with the vertical planes occupied by the lower set of segmented shaping rolls 34, the upper roll housing 41 supports a set of upper segmented shaping rolls 46, each comprising a plurality of segments mounted on a straight upper common shaft 47 for each upper shaping roll 46. The shape of each segment of each upper shaping roll 46 is complementary to the shape of the corresponding segment of the lower shaping roll 34.

The vertical position of each of the upper segmented rolls 46 is adjustable in a manner similar to the adjustment provided for the lower segmented rolls 34. For example, each upper shaft 47 is received rotatably in apertures in upper shaft brackets 58. The latter are rigidly connected at their upper ends to the lower ends of externally threaded rods 60. The latter extend upward through one of the apertures in one of the upper apertured longitudinal angle members 40 and are fixed in position to the latter through pairs of adjustment nuts 64 for each threaded rod, one nut being below angle member 40 and at least one nut mounted above the angle member 40 to determine the vertical position of each end of each upper common shaft 47.

As seen in FIGS. 2 and 3, the segments of the lower segmented rolls 34 form a substantially continuous concave contour in the axial direction of the straight common shaft 33. This shape conforms to the shape desired about an axis parallel to the path the glass sheets take through the roll forming station for an incremental portion of each sheet shaped by roll forming. The segments of the upper segmented rolls 46 have generally convex configurations that are complementary to the configurations of the lower roll segments they oppose. Hence, if all the upper segmented rolls 46 have their shafts 47 in alignment in an upper oblique plane and the lower segmented rolls 34 have their shafts aligned in a lower oblique plane when piston 104 is extended upwardly, segmented rolls 34 are lifted to an oblique plane above the oblique plane occupied by the conveyor rolls 25 and the different increments of a glass sheet moving through the roll forming station are simultaneously engaged by the different pairs of rotatable rolls to impose a transverse curvature on different increments of the traveling sheet simultaneously. The piston 45 retracts slightly to permit the lower segmented rolls 34 to transport the bent glass sheet into the cooling station 22 after rolls 34 and 46 have engaged the glass sheet for sufficient time to impose the desired shape onto the glass.

The composition of the roll segments is very important to insure proper operation of the roll forming apparatus with minimum glass breakage or glass marking. The material must have low thermal conductivity to minimize thermal shock on the hot glass when the latter engages the relatively cold shaping rolls. The rolls must have a low coefficient of thermal expansion over a wide temperature range from room temperature to an elevated temperature approximately 600°F. hotter that the rolls attain on contacting the hot glass. They must be of a composition that does not react chemically with glass, that is durable over a wide temperature range, and is readily shaped or machined to complex contours.

To meet these requirements, the upper segmented shaping rolls 46 and the lower segmented shaping rolls 34 are composed of an asbestos cement sold by Johns Mansville under the trademark of TRANSITE. Furthermore, each of the segments is separated by a low-friction washer having a thickness of approximately one-sixteenth inch.

In order to minimize marking of the glass surface due to rubbing by portions of the shaping rolls whose peripheral velocity differs sufficiently from the speed of the sheet moving through the roll forming apparatus to cause observable rubbing marks, only selected segments of the segmented shaping rolls 34 are keyed to lower shafts 33 to rotate therewith and the remaining segments of the lower shaft are freely rotatable. The same is true of the keying of selected segments of the upper segmented shaping rolls 46 to upper shafts 47. Suitable driving means is provided to rotate conveyor rolls 25 and the keyed segments of shaping rolls 34 and 46 at the same peripheral speed.

In order to insure that the upper roll housing 41 remains in proper alignment with the lower roll housing 31, each housing is provided with an alignment mechanism. The alignment mechanism for the lower roll housing 31 comprises four vertical racks 69 extending vertically downward, two from each of the lower apertured angle members 35 of the lower roll housing 31. Each rack 69 is geared to a gear (not shown) rigidly mounted to the center portion of one of a pair of parallel elongated gear support rods 72 for rotation therewith. Bevel gears 74 at the ends of the gear support rods 72 mesh with bevel gears 75 at the ends of interconnecting rods 76 to provide a rectangular array of gear driven rods rotatably mounted in brackets fixed to the lower piston support structure 105 to assure that all four racks move equal distances relative to the lower piston support structure 105, thus assuring that the lower apertured angle members 35 and their attached vertically adjustable brackets 32 for supporting the ends of the lower shafts 33 and their supported lower segmented shaping rolls 34 move in a proper direction and distance in response to extension or retraction of the piston 104.

A similar arrangement of vertical racks 79 attached at their lower ends to the upper apertured longitudinal angle members 40 of the upper roll housing 41 cooperates with a similar rectangular array of rods and gears 80 supported from an upper piston support structure 145 to assure proper alignment of the upper set of shaping rolls 46 relative to the lower set of shaping rolls 34 when piston 45 actuates movement of upper shaping rolls 46 in unison.

The conveyor rolls 25 are directly connected to a main drive (not shown). Shafts 33 and 47 are connected to their respective main drives through flexible couplings 66 and 65.

The entire roll forming station 21 is mounted on transverse guides 50 to facilitate transverse movement of the station 21 by crank means 52.

This adjustment makes the roll forming apparatus readily available to handle sheets of different widths merely by aligning the longitudinal center line of the roll forming station with the longitudinal center line of the glass sheets traveling through the gas hearth furnace 20.

In the cooling or quenching station 22, cooling air is delivered through upper and lower nozzle boxes 88 which terminate in elongated nozzles 89 having arcuate openings conforming to the shape of the glass sheets conveyed through the cooling or quenching station 22. A skeleton structure 90 supports the nozzles boxes 88. Adjusting means 92 is provided to adjust the position of nozzle boxes 88 relative to the supporting structure 90 and the path taken by glass sheets through the cooling or quenching station 22.

In bending glass sheets to cylindrical shapes having uniform radii of curvature, certain patterns developed defects termed as edge kinks, particularly patterns less than three times as long as the path distance between adjacent shafts for supporting shaping rolls. In a particular embodiment of the present invention utilizing nine pairs of shaping rolls mounted on shafts spaced 8 inches apart center to center, edge kinking has been alleviated by installing additional roller means in the form of a pair of idler rolls of truncated conical shape above the path of glass sheet travel between the seventh and eighth rolls counting from the furnace 20 toward the cooling or quenching station 22. Each idler roll 70 is adjusted in a selected horizontal position along an idler roll shaft 71 and is mounted with its wider end facing transversely inward relative to the path of glass movement. The shaft 71 is supported by a bracket 73. The bracket includes an apertured cross piece 77 mounted on one of a pair of C-shaped beams 81. The beams are supported on the upper, apertured, longitudinal angle members 40. A threaded shaft 83 having an adjustment wheel 85 at its upper end fixes the vertical position of the apertured cross piece 77 relative to upper and lower limits set by the upper and lower flanges of the C-shaped beams 81. It is preferred that when edge kinking is found to exist, roll 70 is lowered to a position where its lower surface portion is at the level or slightly below the level of the lower surface of the upper shaping segments with which it is longitudinally aligned.

With upper shaping rolls 46 spaced 8 inches apart, an idler roll 70 spaced equidistant between adjacent upper shaping rolls reduces the length of uncontacted edge from 8 inches to 4 inches, thus breaking up a repetitive wave of 8 inch wavelength established along the edge or edges so affected. The rolling contact by idler roll 70 irons out the kinked edge, particularly at locations where the amplitude of the kink is a maximum.

The maximum amount by which the idler roll 70 should be lowered is governed by the amplitude of the wave established along the edge or edges. In other words, the lower surface of the idler roll should not exceed the amplitude of the wave formed below the lower surface of the aligned portion of the aligned segment of the upper shaping roll in order to avoid reverse edge kink or the possibility of edge breakage.

When small glass sheets, particularly those having a length less than 24 inches, are processed on the previously described roll forming apparatus, it is necessary to lower one or both idler rolls 70 so that one or both longitudinal edge portions of the glass undergoing processing is engaged at its upper surface only as the glass passes between the seventh and eighth pairs of shaping rolls during its movement from the furnace 20 to the cooling and quenching station 22. The idler rolls that engage the upper surface at one or both longitudinal edge portions of the glass act as auxiliary shaping rolls to iron out edge kinking previously found in the processing of small glass sheets.

While idler rolls 70 are described as of truncated conical shape, for correcting cylindrical bends it is preferred that their outer surface be curved in an axial direction to a convex curve having a radius equal to that of the shaping rolls.

Glass sheets substantially longer than 24 inches in the direction of sheet movement tend to develop a sag in the center portion of their longitudinal dimension. FIG. 3 shows a development to reduce the excess sag to within limits accepted by the customer. In order to simplify the description of this embodiment, the structure of FIG. 2 has been omitted. However, it is understood that roll forming apparatus can also be modified by incorporating both the FIG. 2 and FIG. 3 changes therein.

According to the FIG. 3 embodiment, the additional roller means comprised an auxiliary support roll 125 similar in shape and equal in length to the central segment of the lower shaping rolls 34, which roll 125 was installed directly on the conveyor roll 25 located intermediate the vertical planes occupied by the seventh and eighth pairs of shaping rolls in the roll forming station 21. Axially adjustable collars 126 disposed on oppposite sides of auxiliary support roll 125 hold the latter in its desired axial position along conveyor roll 25 while allowing free rotation of auxiliary support roll 125.

After the glass sheet is shaped by engagement of its bottom surface with the lower segmented shaping rolls 34 and its upper surface with the upper segmented shaping rolls 46, and the shaping rolls are retracted, the additional roll 125, when needed, supports the central portion only of the lower surface of the glass sheet instead of conveyor roll 25. This momentary support of the center portion of the still soft sheet permits the unsupported sections of the sheet flanking the supported center portion to sag momentarily during the passage of the shaped glass sheet thereover. The auxiliary support roll 125 is preferably of a slightly smaller diameter, preferably ½-inch less diameter, than the cross-section of the center segment of the lower shaping roll 34 and is also composed of the same materials as the segments of shaping rolls 34 and 46.

Before the auxiliary support roll was installed, when the roll forming apparatus shaped glass sheets having a pattern known as the Chrysler 1324 having a uniform radius of curvature of 43 inches and a length of 41 inches and a width of 23 inches, the center portion of the sheets developed a positive sag of as much as 0.065 inch to 0.070 inch below a true cylindrical surface for a 41 inch length of cylinder. The addition of the auxiliary support roll 125 around the conveyor roll 25 in the position specified previously reduced the maximum value of this positive sag to less than 0.030 inch. This is well within the tolerance limits set by the customer (presently 0.040 inches).

The introduction of additional roller means such as one or more idler rolls 70 or auxiliary support rolls 125 has made it possible to produce glass shapes within tolerance and without introducing any marks on the glass due to contact with rolls. It has also made it practical to avoid the need for providing a shape to the shaping rolls that differs from the shape desired for the bent glass sheets. In other words, the present invention has provided simple, easily installed techniques for correcting two possible problems arising from the use of roll forming apparatus, namely, edge kinking and excess sagging.

The positions selected for the auxiliary rolls 70 or the auxiliary support rolls 125 need not be between the seventh and eighth pair of corresponding shaping rolls of a nine pair shaping roll roll forming apparatus. The auxiliary rolls need not be located exactly midway between adjacent pairs of shaping rolls, although the midway points are believed preferably because the additional one-sided application of additional rolling contact at the midway point between adjacent pairs of shaping rolls promotes the break-up of the waves or center sag at their maximum amplitude. Furthermore, more than one additional roller means, such as one or more idler rolls 70 (or pairs) and/or more than one auxiliary support roll 125, may be used without departing from the spirit of the present invention.

In case roll forming equipment has a reversed arrangement of shaping rolls, namely a set of concave curvature disposed above a set of complementary convex curvature, the auxiliary rolls 70 or the auxiliary support rolls 125 would be disposed on the side of the path of glass travel needed to reduce edge kinking and excess sagging encountered with such reversed roll forming apparatus. In most instances, the auxiliary rolls 70 would be in position to engage the marginal edge portions of the upper surface of the moving glass sheets and the auxiliary support roll 125 in position to engage the bottom surface of the moving sheets. The orientation of the auxiliary rolls 70 would be reversed to approximate the shape of the aligned upper shaping rolls 46 (which would now be of concave configuration) and the auxiliary support roll 125 shaped to conform to the lower shaping rolls 34 (which would now be of concave configuration).

The form of the invention shown and described in this disclosure represents an illustrative preferred embodiment and several variations thereof. It is understood that the present invention need not be limited to improving the operation of the roll forming apparatus of U.S. Pat. No. 3,701,644 to Robert G. Frank, but may be used to improve the operation of other roll forming apparatus, for example, that of U.S. Pat. No. 3,545,951 to Maurice Nedelec. It is also understood that other changes may be made without departing from the gist of the present invention as defined in the claimed subject matter which follows.

I claim:

1. Apparatus for shaping a deformable sheet by roll forming while continuously moving the latter through said shaping apparatus comprising
    an upper set of rotatable shaping rolls,
    a lower set of rotatable shaping rolls,
    each shaping roll of one set having a longitudinally extending surface, each shaping roll of the other set having a longitudinally extending surface and each shaping roll of said one set having a shape complementary to a corresponding shaping roll of said other set, the longitudinally extending surface of at least one of said shaping rolls having a portion thereof which approaches the central longitudinal axis of that roll to provide a wide space between said portion of that roll and a corresponding portion of an adjacent roll of its set,
    supporting means for mounting auxiliary roller means in said wide space in a position to contact a portion of said deformable sheet conveyed through said shaping apparatus, and
    auxiliary roller means mounted on said supporting means.

2. Apparatus as in claim 1 wherein each shaping roll of said one set has a convex curvature and each shaping roll of said other set has a concave curvature.

3. Apparatus as in claim 2, further including a set of spaced conveyor rolls disposed along a given path of travel through said shaping apparatus, each of said conveyor rolls being disposed between adjacent pairs of said shaping rolls, and
    wherein said additional roller means is supported by one of said spaced conveyor rolls in position to extend above the retracted position occupied by said lower set of shaping rolls.

4. Apparatus as in claim 3, wherein said additional roller means has an outer shaped surface whose curvature matches the curvature of at least one of said segments of a shaping roll of said lower set.

5. Apparatus as in claim 4, wherein said additional roller means is supported on said conveyor roll in longitudinal alignment along said path of travel with a centrally disposed segment of said lower shaping roll.

6. Apparatus as in claim 2, wherein said shaping rolls comprise shaped segments and said additional roller means has an outer shaped surface whose curvature matches the curvature of at least one of said shaped segments.

7. Apparatus as in claim 2, wherein said additional roller means is located in a vertical plane approximately midway between the vertical planes occupied by two adjacent of said shaping rolls.

8. Apparatus as in claim 2, wherein said additional roller means is supported to extend above said given path and in a vertical plane intermediate adjacent of said shaping rolls to make rolling contact with a portion of the lower surface of said sheet when said portion of said sheet deviates downwardly from the shape desired therefor by at least a predetermined amount.

9. Apparatus as in claim 2, wherein said additional roller means is positioned and between two adjacent shaping rolls of said upper set in position to make rolling contact with an edge portion of the upper surface of said sheet when said edge portion of said sheet deviates upwardly from the shape desired therefor by at least a predetermined amount.

10. Apparatus as in claim 9, wherein said additional roller means is located in a vertical plane approximately midway between the vertical planes occupied by adjacent of said shaping rolls.

11. Apparatus as in claim 9, wherein said additional roller means is in the form approximating a truncated cone with the base of the cone facing transversely inward and the apex of the cone facing transversely outward.

12. A method of shaping a deformable sheet comprising engaging the opposite surfaces of said sheet while softened in pressurized engagement between an upper set of rotating shaping rolls and a lower set of rotating shaping rolls, each shaping roll having a longitudinally extending surface, each shaping roll of said one set having shape complementary to a corresponding shaping roll of said other set, the longitudinally extending surface of at least one of said shaping rolls having a portion thereof which approaches the central longitudinal axis of that roll to provide a wide space between said portion of that roll and a corresponding portion of an adjacent roll of its set, and, in said wide space and between said pair of sets of rotating shaping rolls, applying additional rolling contact to a portion of said sheet that deviates from the shape desired while leaving a substantial portion of the remainder of the width of said sheet aligned with a portion free of rolling contact.

13. The method according to claim 12, wherein said additional rolling contact is applied against the upper surface only of said sheet.

14. The method according to claim 13, wherein said additional rolling contact is applied approximately midway between adjacent pairs of rotatable shaping rolls.

15. The method according to claim 13, wherein said rolling contact is applied along at least one edge portion thereof.

16. The method as in claim 13, wherein said rolling contact is applied along a pair of opposite side edge portions thereof.

17. The method according to claim 13, wherein said sheet is glass.

18. The method according to claim 12, wherein said additional rolling contact is applied against the lower surface only of said sheet.

19. The method according to claim 18, wherein said rolling contact is applied along a portion intermediate opposite side edges of said sheet.

20. The method according to claim 18, wherein said additional rolling contact is applied approximately midway between adjacent pairs of rotatable shaping rolls.

21. The method according to claim 18, wherein said sheet is glass.

* * * * *

UNITED STATES PATENT OFFICE
CERTIFICATE OF CORRECTION

PATENT NO. : 3,869,269

DATED : March 4, 1975

INVENTOR(S) : Isaac D. Knapp

It is certified that error appears in the above-identified patent and that said Letters Patent are hereby corrected as shown below:

Claim 9, column 11, line 24, after "positioned" delete "and".

Signed and sealed this 24th day of June 1975.

(SEAL)
Attest:

RUTH C. MASON
Attesting Officer

C. MARSHALL DANN
Commissioner of Patents
and Trademarks